United States Patent
Rawlinson

(10) Patent No.: US 9,283,837 B1
(45) Date of Patent: Mar. 15, 2016

(54) COMPLIANTLY MOUNTED MOTOR ASSEMBLY UTILIZING DUAL LEVELS OF VIBRATION ISOLATION

(71) Applicant: Atieva, Inc., Redwood City, CA (US)

(72) Inventor: Peter Dore Rawlinson, Worcestershire (GB)

(73) Assignee: ATIEVA, INC., Menlo Park, CA (US)

( * ) Notice: Subject to any disclaimer, the term of this patent is extended or adjusted under 35 U.S.C. 154(b) by 0 days.

(21) Appl. No.: 14/607,194

(22) Filed: Jan. 28, 2015

(51) Int. Cl.
  *B60K 1/04* (2006.01)
  *B60K 1/00* (2006.01)
  *F16F 1/373* (2006.01)
  *B60L 11/18* (2006.01)
  *H02K 5/04* (2006.01)

(52) U.S. Cl.
  CPC ... *B60K 1/00* (2013.01); *B60K 1/04* (2013.01); *B60L 11/18* (2013.01); *F16F 1/3732* (2013.01); *H02K 5/04* (2013.01); *F16F 2224/025* (2013.01); *F16F 2238/02* (2013.01)

(58) Field of Classification Search
  CPC ............ B60K 1/00; B60K 1/04; B60L 11/18; B60L 11/1803; B62D 37/04; F16F 1/3732; F16F 224/025; F16F 7/10; F16F 7/104; F16F 15/00; F16F 15/04
  See application file for complete search history.

(56) References Cited

U.S. PATENT DOCUMENTS

| | | | | |
|---|---|---|---|---|
| 2,951,674 A | * | 9/1960 | Rice | F16F 1/3732 267/141.4 |
| 3,773,132 A | * | 11/1973 | Gawlik | B60K 1/00 180/291 |
| 3,927,728 A | * | 12/1975 | Reime | B60K 1/00 180/60 |
| 4,181,188 A | * | 1/1980 | Dessert | B60K 1/00 136/291 |
| RE31,156 E | * | 2/1983 | Dessert | B60K 1/00 180/2.2 |
| 5,331,239 A | * | 7/1994 | Kwun | H02K 17/30 310/68 R |
| 5,558,949 A | * | 9/1996 | Iwatsuki | H01M 2/1083 180/68.5 |
| 6,315,094 B1 | * | 11/2001 | Griffin | F16F 7/10 188/379 |
| 6,533,696 B1 | * | 3/2003 | Takenaka | B60K 6/40 180/65.235 |
| 7,614,469 B2 | * | 11/2009 | Kumar | H01M 2/1077 180/68.5 |
| 8,002,063 B2 | * | 8/2011 | Rydberg | B60R 16/04 180/68.5 |
| 8,517,127 B2 | * | 8/2013 | Kanno | B60K 1/00 180/65.1 |
| 8,720,636 B2 | * | 5/2014 | Akoum | B60K 1/00 180/299 |
| 8,944,401 B2 | * | 2/2015 | Guest | F16F 15/08 248/500 |
| 8,960,357 B2 | * | 2/2015 | Maurer | B60K 1/04 180/291 |

(Continued)

FOREIGN PATENT DOCUMENTS

| | | | | |
|---|---|---|---|---|
| DE | 102012211516 A1 | * | 5/2014 | ............ B62K 3/002 |
| FR | 2962376 A1 | * | 1/2012 | ............... B60K 1/00 |
| WO | WO 2011121758 A1 | * | 10/2011 | ............... B60K 1/00 |

*Primary Examiner* — Paul N Dickson
*Assistant Examiner* — Steve Clemmons
(74) *Attorney, Agent, or Firm* — Patent Law Office of David G. Beck

(57) ABSTRACT

A dual level, vibration isolation system is provided that isolates a vehicle in general, and the vehicle's passenger cabin in particular, from the vibrations generated by the vehicle's motor during normal operation. The first isolation level uses a first plurality of isolation bushings to mount the motor assembly to a first portion of the battery pack. The second isolation level uses a second plurality of isolation bushings to mount the first portion of the battery pack either directly to the vehicle or indirectly to the vehicle via a second portion of the battery pack. In addition to providing two levels of vibration isolation, this compliant mounting scheme allows the mass of the battery pack to absorb and damp out undesirable rotational oscillations caused by the motor, especially when the motor is undergoing strong acceleration or deceleration.

16 Claims, 2 Drawing Sheets

(56) References Cited

U.S. PATENT DOCUMENTS

| | | | | |
|---|---|---|---|---|
| 8,991,530 B2* | 3/2015 | Langer | ................... | B60K 1/00 180/312 |
| 9,150,095 B2* | 10/2015 | Matano | ................ | B60K 11/04 |
| 2007/0120301 A1* | 5/2007 | Domen | ................ | F16F 1/3732 267/152 |
| 2008/0059012 A1* | 3/2008 | Konopa | ................ | B60G 13/16 701/22 |
| 2009/0078519 A1* | 3/2009 | Carcaterra | ................ | F16F 7/10 188/379 |
| 2014/0060918 A1* | 3/2014 | Kushima | ................ | H02K 5/24 174/520 |
| 2015/0283955 A1* | 10/2015 | Sakamoto | ............. | F16B 5/0241 248/636 |

* cited by examiner

COMPLIANTLY MOUNTED MOTOR ASSEMBLY UTILIZING DUAL LEVELS OF VIBRATION ISOLATION

FIELD OF THE INVENTION

The present invention relates generally to electric motors and, more particularly, to a motor assembly mounting system for use in an electric vehicle.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

The most common approach to achieving a low emission, high efficiency car is through the use of a hybrid drive train in which an internal combustion engine (ICE) is combined with one or more electric motors. In general there are three types of hybrid drive trains: parallel hybrid, series-parallel hybrid, and series hybrid. In a parallel hybrid drive train, the power required to propel the vehicle may be provided by the internal combustion engine or the electric motor, either individually or together. In a series-parallel hybrid drive train, propulsive power is provided by both the internal combustion engine and the electric motor using a power splitter such as a planetary gear set. In a series hybrid drive train, propulsive power is only supplied by the electric motor and the internal combustion engine, which is coupled to a generator, is only used to charge the batteries as necessary.

While hybrid vehicles provide improved gas mileage and lower vehicle emissions, due to their inclusion of an internal combustion engine they still suffer from many of the inherent limitations of such a power source. For example, during operation the vehicle still emits harmful pollution, albeit at a reduced level compared to a conventional vehicle. Additionally, due to the inclusion of both an internal combustion engine and an electric motor(s) with its accompanying battery pack, the drive train of a hybrid vehicle is typically much more complex, resulting in increased cost and weight. Accordingly, several vehicle manufacturers are designing vehicles that only utilize an electric motor, or multiple electric motors, thereby eliminating one source of pollution while significantly reducing drive train complexity.

In general, the simplicity of an electric motor-based drive train results in improved reliability over that achievable with an ICE-based drive train. Unfortunately, vibrations within an electric drive train are often difficult to control, especially in a front wheel drive configuration. If uncontrolled, these drive train vibrations are transmitted into the passenger cabin, leading to undesirable noise and vibration. Accordingly, what is needed is a mounting system for use with an electric motor assembly that reduces the transmission of drive train vibrations into the passenger cabin, thereby improving passenger comfort. The present invention provides such a motor assembly mounting system.

SUMMARY OF THE INVENTION

The present invention provides a dual level, vibration isolation system for an electric vehicle, the system comprising (i) a motor assembly enclosure, where an electric motor used to provide propulsive power to the vehicle is disposed within the motor assembly enclosure; (ii) a battery pack; (iii) a plurality of motor assembly support members (e.g., fabricated from aluminum, steel, or a composite material), where the first end portion of each of the motor assembly support members is rigidly coupled to the motor assembly enclosure, where the second end portion of each of the motor assembly support members is compliantly coupled to a first portion of the battery pack using a first plurality of flexible bushings (e.g., rubber or synthetic bushings), and where the motor assembly support members maintain the motor assembly enclosure at a distance from the first portion of the battery pack; and (iv) a plurality of compliant battery pack mounting members which compliantly couple the first portion of the battery pack to a structure of the electric vehicle using a second plurality of flexible bushings (e.g., rubber or synthetic bushings). The motor assembly support members may be integral to the motor assembly enclosure and fabricated as an extension of the enclosure; alternately, the motor assembly support members may be distinct and fabricated separately from the motor assembly enclosure and then bolted, welded, or brazed to the motor assembly enclosure.

In one aspect, the plurality of compliant battery pack mounting members further comprise a plurality of battery pack stand-offs, where a first end portion of each of the battery pack stand-offs is rigidly coupled to the first portion of the battery pack, where a second end portion of each of the battery pack stand-offs is compliantly coupled to the vehicle's structure (e.g., rocker panel structures, vehicle frame, etc.) using the second plurality of flexible bushings, and where the battery pack stand-offs maintain the first portion of the battery pack at a second distance from the structure of the electric vehicle.

In another aspect, a second portion of the battery pack is interposed between the first portion of the battery pack and the vehicle's structure, where the plurality of compliant battery pack mounting members compliantly couple the first portion of the battery pack to the second portion of the battery pack, and where the second portion of the battery pack is rigidly coupled to the vehicle's structure (e.g., rocker panel structures, vehicle frame, etc.) using a plurality of non-compliant battery pack mounting members. The plurality of compliant battery pack mounting members may further comprise a plurality of battery pack stand-offs, where a first end portion of each of the battery pack stand-offs is rigidly coupled to the first portion of the battery pack, where a second end portion of each of the battery pack stand-offs is compliantly coupled to the second portion of the battery pack using the second plurality of flexible bushings, and where the battery pack stand-offs maintain the first portion of the battery pack at a second distance from the second portion of the battery pack.

In another aspect, a transmission may be disposed within the motor assembly enclosure, where the transmission is coupled to the electric motor and to the vehicle's drive shaft.

In another aspect a power inverter enclosure, which contains a power inverter that is used to convert DC current supplied by the battery pack to AC current capable of operating the electric motor, is mechanically coupled to the motor assembly enclosure. A plurality of inverter support members may be used to mechanically couple the power inverter enclosure to the motor assembly enclosure, where the inverter support members are rigidly coupled to the motor assembly enclosure and either (i) rigidly coupled to the power inverter enclosure or (ii) compliantly coupled to the power inverter enclosure using a third plurality of flexible bushings.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, similarly, a first step could be termed a second step, similarly, a first component could be termed a second component, all without departing from the scope of this disclosure.

In a typical electric vehicle (EV), regardless of whether the EV is an all-electric vehicle, a plug-in hybrid vehicle, also referred to as a PHEV, or a hybrid vehicle, also referred to as a HEV, the motor assembly is mounted to the vehicle frame via a plurality of bushings. These bushings help to isolate the vehicle, and in particular the vehicle's passenger cabin, from the vibrations generated by the motor during normal operation. In order to achieve improved vibration isolation, the present inventor has found that dual levels of isolation are preferred. Unfortunately dual isolation levels are difficult to achieve in an EV with a large battery pack, especially if the EV is configured as a front wheel drive car. Accordingly, the present mounting system mounts the motor assembly to a portion of the battery pack via a first plurality of isolation bushings, with this portion of the battery pack being mounted via a second plurality of isolation bushings either directly to the vehicle or indirectly to the vehicle via the remaining portion of the battery pack. In addition to providing two levels of vibration isolation, this compliant mounting scheme allows the mass of the battery pack to absorb and damp out undesirable rotational oscillations caused by the motor, especially when the motor is undergoing strong acceleration or deceleration. Absorbing and damping out such oscillations improves component life while reducing the magnitude of noise and vibration transferred from the drive train to the passenger cabin, thereby providing a smoother ride with increased passenger comfort and driver control.

Figure 1:
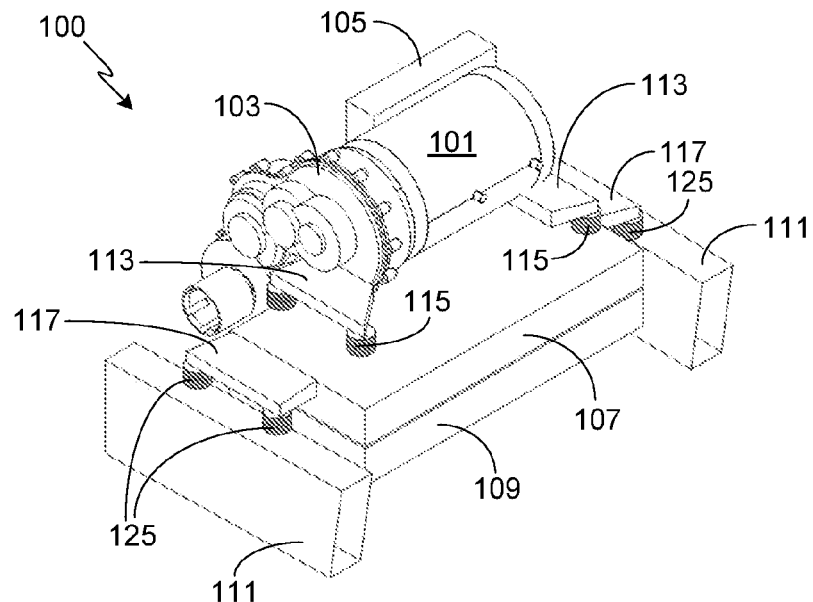
FIG. 1 provides a perspective view of a two level vibration isolation mounting system used to compliantly mount an EV's motor-transmission assembly.
Figure 2:
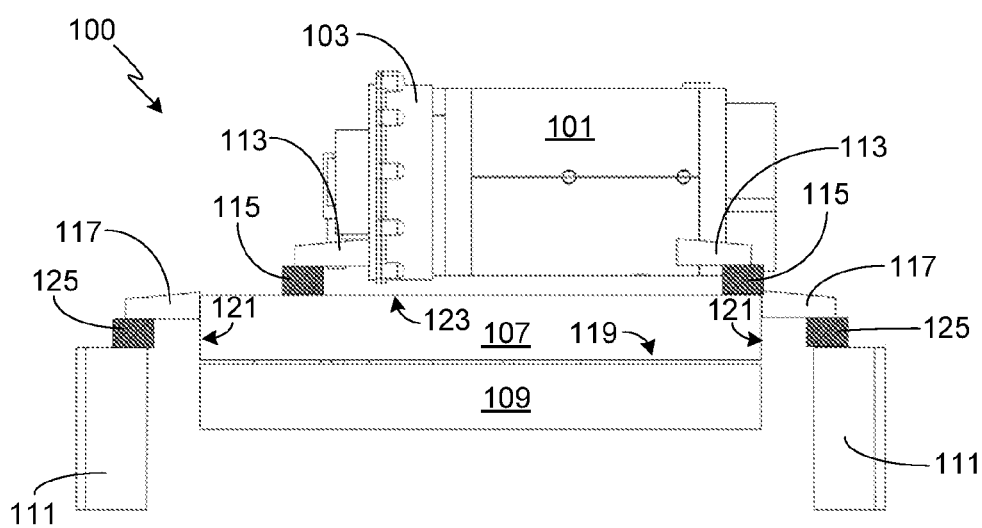
FIG. 2 provides an end view of the mounted motor-transmission assembly shown in FIG. 1.

FIGS. 1 and 2 illustrate a preferred embodiment of the dual-level compliant mounting system of the invention, where each level of compliant mounting provides vibration isolation via a plurality of flexible, non-rigid couplings. FIG. 1 provides a perspective view of the mounting system while FIG. 2 provides an end view of the same system. Visible in FIGS. 1 and 2 is motor 101, transmission 103, and inverter 105. To simplify the figures and insure clarity, the electrical connections between inverter 105 and the battery pack as well as those between the inverter 105 and the motor 101 are not shown. Similarly, the cooling conduits used to couple the drive system to a cooling system are not shown.

Preferably motor 101 is a three phase alternating current (i.e., AC) motor. Motor 101 is coupled to the vehicle's drive shaft, and preferably to a pair of drive half-shafts, via transmission 103. Transmission 103 may be a single speed, fixed gear transmission or a multi-speed (e.g., two speed) transmission. In at least one preferred configuration, the motor-transmission housing is configured to allow the rotor shaft and the drive shaft to be supported by three, rather than four, bearing assemblies as disclosed in co-assigned U.S. patent application Ser. No. 14/503,683, filed 1 Oct. 2014, the disclosure of which is incorporated herein.

Inverter 105 converts the direct current (i.e., DC) power from the vehicle's battery pack to match the power requirements of motor 101 which, as noted above, is preferably comprised of an AC motor. Inverter 105 may be mounted to the motor-transmission housing using a plurality of compliant mountings such as those disclosed in co-assigned U.S. patent application Ser. No. 14/176,053, filed 8 Feb. 2014, the disclosure of which is incorporated herein. Alternately, inverter 105 may be rigidly mounted to the motor-transmission housing.

Also visible in FIGS. 1 and 2 is a portion of the EV's battery pack, this portion including an upper battery tray (also referred to herein as a battery pack subassembly) 107 and a lower battery tray 109. Contained within each battery tray is a plurality of individual batteries, not shown. Typical battery chemistries include, but are not limited to, lithium ion, lithium ion polymer, nickel metal hydride, nickel cadmium, nickel hydrogen, nickel zinc, and silver zinc. It will be appreciated that depending upon the desired battery pack capacity as well as the type and capacity of the individual batteries used to populate the battery pack in general, and the individual battery trays in particular, the batteries within the battery pack of the invention may be connected in parallel, series, or in a series-parallel manner. Exemplary interconnect configurations are disclosed in co-assigned U.S. patent application Ser. No. 13/794,535, filed 11 Mar. 2013, the disclosure of which is incorporated herein for any and all purposes. Similarly, the batteries of the battery pack may be stacked in any of a variety of arrangements, and cooled using any of a variety of different thermal management systems. The use of battery subassemblies simplifies battery pack fabrication, assembly, testing and repair.

In the embodiment illustrated in FIGS. 1 and 2 the battery pack, and more specifically battery tray 107, is sized to extend substantially between left and right vehicle frame members 111. Each frame member 111 may be comprised of a vehicle rocker panel structure, a vehicle side rail, or other frame structure.

Extending from the motor assembly enclosure are at least two motor assembly support members 113. As shown, support members 113 hold the motor assembly off and away from battery pack subassembly 107. Support members 113 may be fabricated as part of the motor-transmission housing as shown. Alternately, support members 113 may be distinct and separately fabricated members that are attached to the motor-transmission housing by bolting, welding, brazing or other means. In the preferred embodiment support members 113 are fabricated from aluminum, although other metals (e.g., steel) and non-metals (e.g., composites) may be used. At or near the end of each support member 113 is at least one bushing collar 115 which holds a rubber or synthetic bushing. The bushing/collar assemblies corresponding to each support member 113 are preferably bolted to battery tray 107. It should be understood that while the embodiment of the invention shown in FIGS. 1 and 2 includes two support members 113, each of which utilizes two bushing/collar assemblies 115, the system can use more than two support members 113 and a different number of bushing/collar assemblies 115 than shown.

A plurality of battery pack support members 117, also referred to herein as stand-offs, extend from the portion of the battery pack to which the motor-transmission housing is compliantly mounted. Support members 117 provide a means for compliantly mounting the battery pack to the vehicle, e.g., frame members 111. In the embodiment shown in FIGS. 1 and 2, support members 117 are physically coupled to upper battery tray 107. It should be understood, however, that the battery pack may be compliantly mounted to the frame using support members extending from other portions of the battery pack, for example lower battery tray 109.

Support members 117 may be fabricated as part of, and therefore be integral to, the battery pack housing. For example, support members 117 may be integral to a lower battery pack housing panel (e.g., housing floor panel 119); alternately, support members 117 may be integral to the battery pack housing side walls (e.g., walls 121); alternately, support members 117 may be integral to an upper battery pack housing panel (e.g., housing lid 123). In an alternate configuration, support members 117 are distinct and separately fabricated members that are attached to the battery pack enclosure (e.g., to walls 119, 121 or 123) by bolting, welding, brazing or other means. In the preferred embodiment, support members 117 are fabricated from aluminum, although other metals (e.g., steel) and non-metals (e.g., composites) may be used. At or near the end of each support member 117 is at least one bushing collar 125 that holds a rubber or synthetic bushing. The bushing/collar assemblies 125, each of which provide vibration isolation via a compliant, non-rigid coupling bushing, are preferably bolted to vehicle frame members 111. It should be understood that while two compliant battery pack support members 117 are shown in the figures, each of which utilizes two bushing/collar assemblies 125, the system can utilize more than the two support members 117 and the four bushing/collar assemblies 125 shown in the figures.

Figure 3:
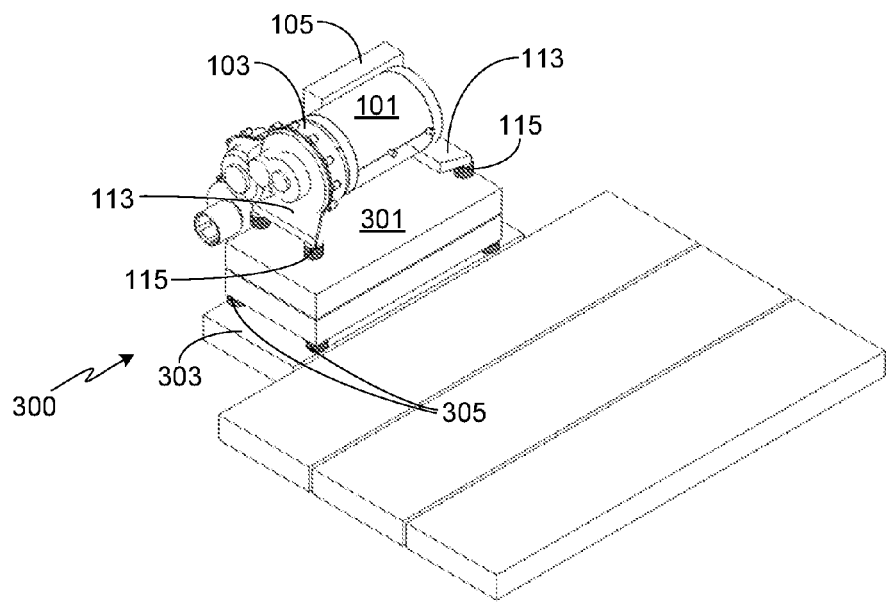
FIG. 3 provides a perspective view of an alternate two level vibration isolation mounting system used to compliantly mount an EV's motor-transmission assembly.
Figure 4:
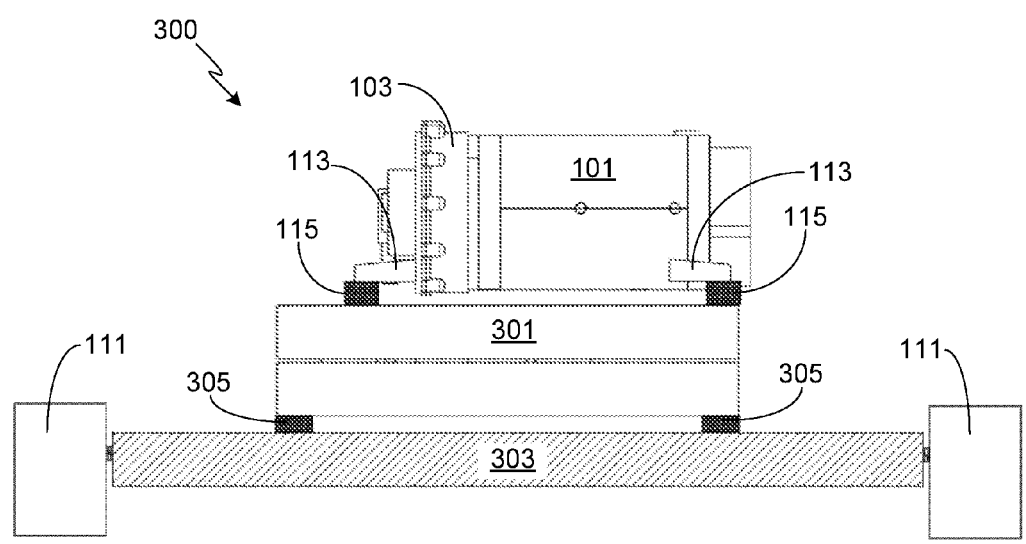
FIG. 4 provides an end view of the mounted motor-transmission assembly shown in FIG. 3.

FIGS. 3 and 4 illustrate an alternate embodiment of the invention. As in assembly 100, the motor-transmission housing of assembly 300 is compliantly mounted to a first portion of the battery pack using a plurality of support members 113 and a plurality of bushing/collar assemblies 115, thereby providing a first level of vibration isolation between the motor assembly and the vehicle. In assembly 300, however, the second level of vibration isolation is achieved by compliantly mounting the first portion of the battery pack to a second portion of the battery pack, where the second portion of the battery pack is rigidly coupled to the vehicle frame, e.g., frame members 111.

In the exemplary embodiment of assembly 300 shown in FIGS. 3 and 4, the motor assembly enclosure utilizes multiple support members 113 as in the prior embodiment. As shown, support members 113 hold the motor assembly off and away from a portion 301 of the battery pack. Support members 113 may either be fabricated as part of the motor-transmission housing as shown or fabricated separately from the motor-transmission housing and then attached to the housing via bolting, welding, brazing or other means. In the preferred embodiment support members 113 are fabricated from aluminum, although other materials may be used such as other metals (e.g., steel) or non-metals (e.g., composites). At or near the end of each support member 113 is at least one bushing collar 115 that holds a rubber or synthetic bushing. The bushing/collar assembly of each support member 113 is preferably bolted to battery subassembly 301, for example to a battery pack housing cover plate as shown. Alternately, the bushing/collar assembly(s) corresponding to each support member 113 may be attached to another surface of subassembly 301 (e.g., a battery tray side wall). It should be understood that while assembly 300 of FIGS. 3 and 4 is shown using two support members 113, each of which utilizes two bushing/collar assemblies 115, the system can use more than two support members 113 and a different number of bushing/collar assemblies 115 than shown.

Battery pack subassembly 301 is compliantly mounted to a second portion 303 of the battery pack using a plurality of bushing/collar assemblies 305. Each assembly 305 utilizes a rubber or synthetic bushing to provide vibration isolation between battery pack portions 301 and 303. Preferably the bushing/collar assemblies 305 are interposed between battery pack portions 301 and 303 as shown, although it should be understood that other means, such as brackets or stand-offs, may be used in combination with the bushing/collar assemblies to locate the compliant mountings. Additionally, it will be appreciated that the invention does not require a specific number of bushing/collar assemblies, i.e., the compliant mounting system of the invention may use a fewer number, or a greater number, of bushing/collar assemblies 305. Although not shown, it should be understood that the second portion 303 of the battery pack is rigidly attached to the vehicle frame, e.g., members 111.

As noted above, the dual level isolation system provided by the invention helps to isolate the vehicle in general, and the passenger cabin in particular, from vibration and noise generated by the motor-transmission assembly. A distinct advantage of the present approach is that it allows the assembly to be tuned, for example in order to remove specific harmonics. In the initial design stage, the degree to which the motor-transmission assembly is allowed to move relative to the vehicle frame may be tuned by selecting the number and location of the support members (e.g., members 113 and 117), the choice of support member material (e.g., aluminum versus steel versus a composite, etc.), the dimensions of each support member (e.g., thickness and width), the separation distance between the motor-transmission housing and the first portion of the battery pack, the separation distance between the first portion of the battery pack and either the frame (e.g., assembly 100) or the second portion of the battery pack (e.g., assembly 300), and the number and location of the bushing/collar assemblies (e.g., assemblies 115, 125, and 305). During assembly, further tuning can be achieved based on the material characteristics of the selected bushings (e.g., rubber versus synthetic material, bushing material density, etc.).

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A dual level, vibration isolation system for an electric vehicle, comprising:
    a motor assembly enclosure, wherein an electric motor is disposed within said motor assembly enclosure, and wherein said electric motor provides propulsive power to said electric vehicle;
    a battery pack;
    a plurality of motor assembly support members, wherein a first end portion of each of said plurality of motor assembly support members is rigidly coupled to said motor assembly enclosure, wherein a second end portion of each of said plurality of motor assembly support members is compliantly coupled to a first portion of said battery pack using a first plurality of flexible bushings, and wherein said plurality of motor assembly support members maintain said motor assembly enclosure at a distance from said first portion of said battery pack; and
    a plurality of compliant battery pack mounting members, wherein said plurality of compliant battery pack mounting members compliantly couple said first portion of said battery pack to a second portion of said battery pack using a second plurality of flexible bushings, and wherein said second portion of said battery pack is rigidly coupled to a structure of said electric vehicle using a plurality of non-compliant battery pack mounting members.

2. The dual level, vibration isolation system of claim 1, wherein said structure of said electric vehicle is comprised of a vehicle frame.

3. The dual level, vibration isolation system of claim 1, wherein said structure of said electric vehicle is comprised of a pair of vehicle rocker panel structures.

4. The dual level, vibration isolation system of claim 1, said plurality of compliant battery pack mounting members further comprising a plurality of battery pack stand-offs, wherein a first end portion of each of said plurality of battery pack stand-offs is rigidly coupled to said first portion of said battery pack, and wherein a second end portion of each of said plurality of battery pack stand-offs is compliantly coupled to said second portion of said battery pack using said second plurality of flexible bushings, and wherein said plurality of battery pack stand-offs maintain said first portion of said battery pack at a second distance from said second portion of said battery pack.

5. The dual level, vibration isolation system of claim 1, further comprising a transmission disposed within said motor assembly enclosure, wherein said transmission is coupled to said electric motor and coupled to a drive shaft.

6. The dual level, vibration isolation system of claim 1, further comprising a power inverter disposed within a power inverter enclosure, said power inverter configured to convert DC current supplied by said battery pack to AC current capable of operating said electric motor, wherein said power inverter enclosure is mechanically coupled to said motor assembly enclosure.

7. The dual level, vibration isolation system of claim 6, further comprising a plurality of inverter support members, wherein a first end portion of each of said plurality of inverter support members is rigidly coupled to said motor assembly enclosure, and wherein a second end portion of each of said plurality of inverter support members is rigidly coupled to said power inverter enclosure.

8. The dual level, vibration isolation system of claim 6, further comprising a plurality of inverter support members, wherein a first end portion of each of said plurality of inverter support members is rigidly coupled to said motor assembly enclosure, and wherein a second end portion of each of said plurality of inverter support members is compliantly coupled to said power inverter enclosure using a third plurality of flexible bushings.

9. The dual level, vibration isolation system of claim 1, wherein each of said plurality of motor assembly support members is integral to said motor assembly enclosure and fabricated as an extension of said motor assembly enclosure.

10. The dual level, vibration isolation system of claim 1, wherein each of said plurality of motor assembly support members is distinct and fabricated separately from said motor assembly enclosure.

11. The dual level, vibration isolation system of claim 10, wherein said first end portion corresponding to each of said plurality of motor assembly support members is bolted to said motor assembly enclosure.

12. The dual level, vibration isolation system of claim 10, wherein said first end portion corresponding to each of said plurality of motor assembly support members is welded to said motor assembly enclosure.

13. The dual level, vibration isolation system of claim 10, wherein said first end portion corresponding to each of said plurality of motor assembly support members is brazed to said motor assembly enclosure.

14. The dual level, vibration isolation system of claim 1, wherein said first plurality of bushings are fabricated from a material selected from the group consisting of rubber and synthetic materials.

15. The dual level, vibration isolation system of claim 1, wherein said second plurality of bushings are fabricated from a material selected from the group consisting of rubber and synthetic materials.

16. The dual level, vibration isolation system of claim 1, wherein said plurality of motor assembly support members are fabricated from a material selected from the group consisting of aluminum, steel and composite materials.

* * * * *